UNITED STATES PATENT OFFICE.

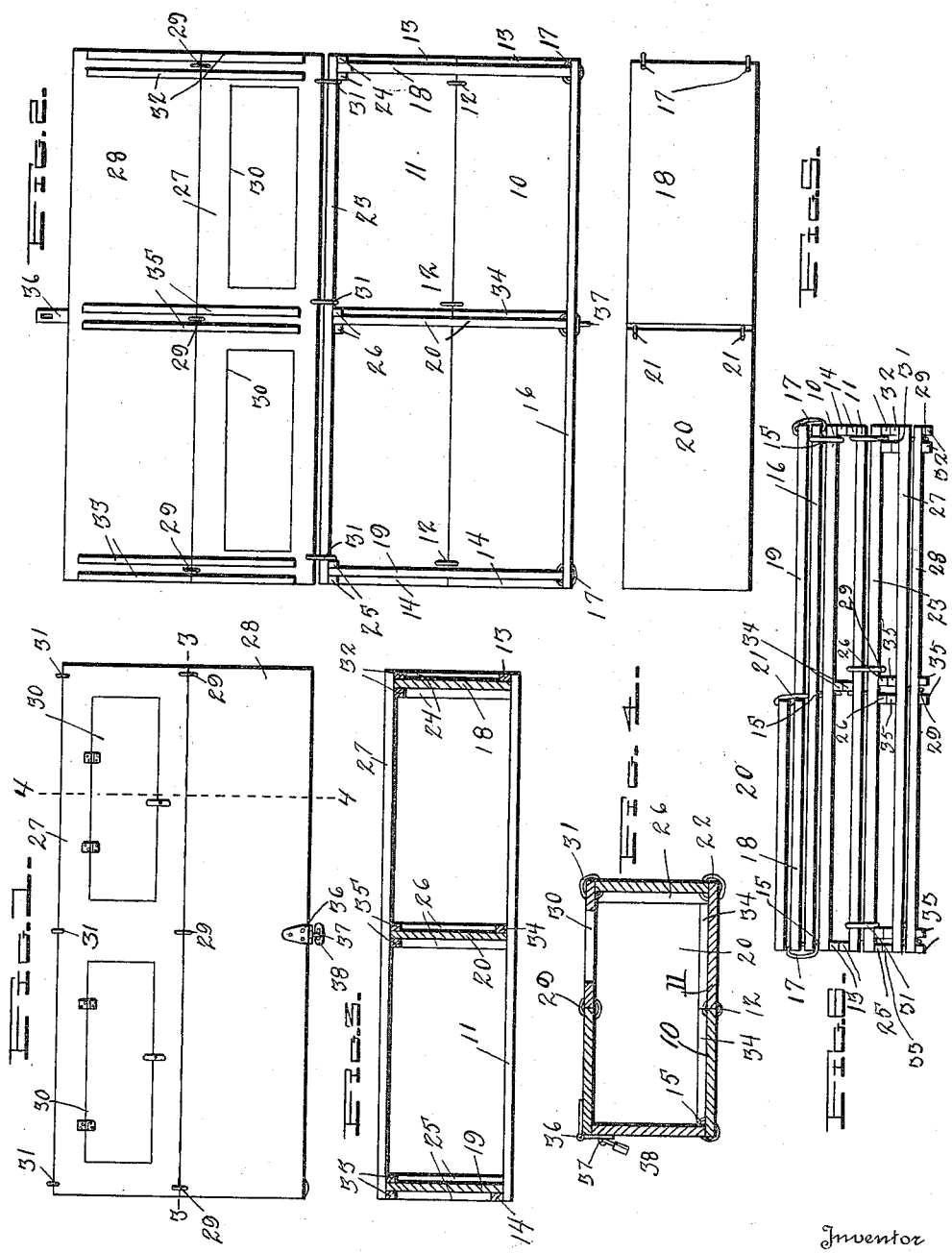

RAY MALVIN CROUSE, OF GREAT BEND, KANSAS.

FOLDING CRATE.

1,155,404.   Specification of Letters Patent.   Patented Oct. 5, 1915.

Application filed October 13, 1914. Serial No. 866,487.

*To all whom it may concern:*

Be it known that I, RAY M. CROUSE, a citizen of the United States, residing at Great Bend, in the county of Barton, State of Kansas, have invented certain new and useful Improvements in Folding Crates; and I do hereby declare the following to be a full, clear, and exact description of the invention, such as will enable others skilled in the art to which it appertains to make and use the same.

This invention relates to folding boxes, particularly to that type adapted for use as chicken coops, and has for its object the provision of a novel and efficient device which may be expanded and secured to form a poultry coop and which may be collapsed for convenience in transportation or storage when empty.

An important object is the provision of a device of this character which will be extremely simple and inexpensive in manufacture, efficient and durable in use, and a general improvement of the art.

With these and other objects and advantages in view, the invention consists in the novel construction and arrangement of parts as will be hereinafter more fully described and claimed, and illustrated in the accompanying drawing, in which:

Figure 1 is a plan view of the case or crate assembled, showing it in its expanded and closed position, Fig. 2 is a similar view showing the cover swung open, Fig. 3 is a longitudinal sectional view, on the line 3—3 of Fig. 1, Fig. 4 is a cross-sectional view on the line 4—4 of Fig. 1, Fig. 5 is a plan view of the crate folded, and Fig. 6 is a side elevation thereof.

Referring more particularly to the drawings the numerals 10 and 11 designate the similar sections of the bottom, which are hinged together at their contiguous edges as shown at 12. The sections 10 and 11 are provided at their ends with cleats 13 and 14. Hingedly secured upon the free edge of the section 10 as shown at 15 is one side wall 16 to the ends of which are hinged as shown at 17 end walls 18 and 19. A partition wall 20 is also hinged upon the side wall 16 as shown at 21. Hinged upon the free edge of the bottom section 11 as shown at 22 is the other side wall 23 which is provided upon its ends with spaced cleats 24 and 25 and at its center with spaced cleats 26.

The cover comprises two similar sections 27 and 28 hinged together at their contiguous edges as shown at 29. The section 27 is provided with openings 30 and is hingedly connected with the side wall 23 as shown at 31. The sections 27 and 28 of the cover are provided upon their ends with spaced cleats 32 and 33.

In order to assemble the crate into its expanded position, the sections 10 and 11 are disposed upon the floor or ground and the side wall 16 is moved upwardly to extend at right angles thereto. The end walls 18 and 19 are then swung outwardly upon the hinges 17 until they engage the cleats 13 and 14 respectively which will limit their outward movement. The partition 20 is then swung upon its hinges 21 until it engages cleats 34 secured upon the sections 10 and 11. The side 23 is then swung upwardly upon its hinges 22 whereupon the cleats 24 at one end will be disposed against the sides of the end 18, the cleats 25 will be disposed on both sides of the end 19, and the cleats 26 will be disposed on both sides of the partition 20. The outermost of the cleats 24 and 25 and the right hand ones of the cleats 26 terminate short of the edge of the side wall 23 contiguous to the section 11 so as not to interfere with the cleats 13, 14 and 34. The cover sections 27 and 28 are then swung over so that the cleats 32 will be disposed against the sides of the end wall 18, the cleats 33 will be disposed against the sides of the end wall 19, and the central cleats 35 will be disposed against the sides of the partition 20. The ends of the cleats 32, 33 and 35 terminate short of the edge of the section 27 connected with the side 23 so as not to interfere with the cleats 24, 25 and 26 respectively and said cleats also terminate short of the outer edge of the section 28 so as not to interfere with the side wall 16.

When the crate has been thus expanded and the various parts interlocked by means of the various cleats, it may be secured in its set up position by means of a hasp 36 engaging a staple 37, as shown. An ordinary padlock 38 may be passed through the staple 37 for locking the crate. When the crate is thus set up, it may be used for a multiplicity of purposes, though it is well adapted for the transportation of poultry. When used for this purpose, light and air are admitted through the openings 30 in the cover.

When it is desired to collapse the crate, the padlock 38 is removed, the hasp 36 is disengaged from the staple 37, the cover sections 27 and 28 are swung back off from the remainder of the device and are then folded upon each other, after which the side wall 23 is swung down, the side wall 16 is swung down, the ends 18 and 19 are swung inwardly upon the side 16, the partition 20 is swung down onto the outer face of the end 18 after which both cover sections are folded over upon the side 23, the bottom section 11 is swung under the side 23 and then over onto the section 10 after which the side 16 carrying the ends and the partition is swung under the section 10. The device will then appear as a flat rectangular body having only the combined thickness of the various sections and will occupy but little space for transportation and storage.

From the foregoing description and a study of the drawing it will be apparent that I have thus provided a simple, novel and efficient crate which may be readily expanded for use and which may be easily and quickly collapsed for convenience in transportation and storage, the various parts being rigidly held against displacement while in their expanded position.

It will be readily understood that I reserve the right to make various changes in the form, construction and arrangement of parts without departing from the spirit of the invention or limiting the scope of the subjoined claim.

Having thus described my invention, I claim:

A folding crate comprising a bottom formed in two similar sections hinged together, cleats on the ends of said sections, a side wall hinged upon one edge of one of said sections, end walls hinged upon said side wall and engaging said cleats, a second side wall hinged upon the free edge of the other bottom section, pairs of cleats on the ends of said second named side wall engaging the ends of said end walls, a cover formed of two similar sections hinged together, one edge of one of said cover sections being hingedly connected with the free edge of said second named side wall, pairs of cleats upon the ends of said cover sections engaging the top edges of said end walls, and means on said cover coöperating with means on said first named side wall for securing the device in its expanded position, all of said walls and sections being foldable upon one another when in their collapsed position.

In testimony whereof, I affix my signature, in the presence of two witnesses.

RAY MALVIN CROUSE.

Witnesses:
 CHARLIE W. CROUSE,
 ANDREW BOYD.

Copies of this patent may be obtained for five cents each, by addressing the "Commissioner of Patents, Washington, D. C."